April 28, 1959

R. A. H. BROCHARD 2,884,104

MECHANICAL COUPLING DEVICES

Filed March 23, 1956

April 28, 1959 R. A. H. BROCHARD 2,884,104
MECHANICAL COUPLING DEVICES
Filed March 23, 1956 2 Sheets-Sheet 2
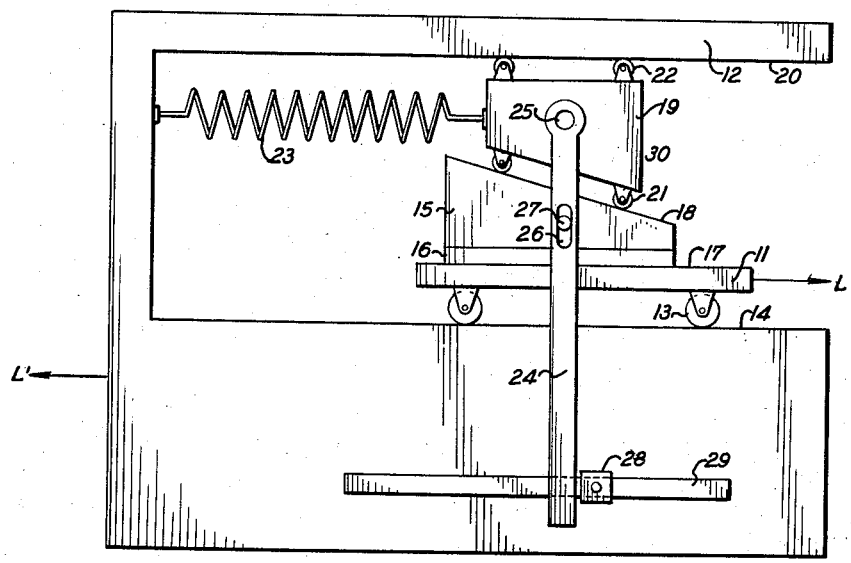
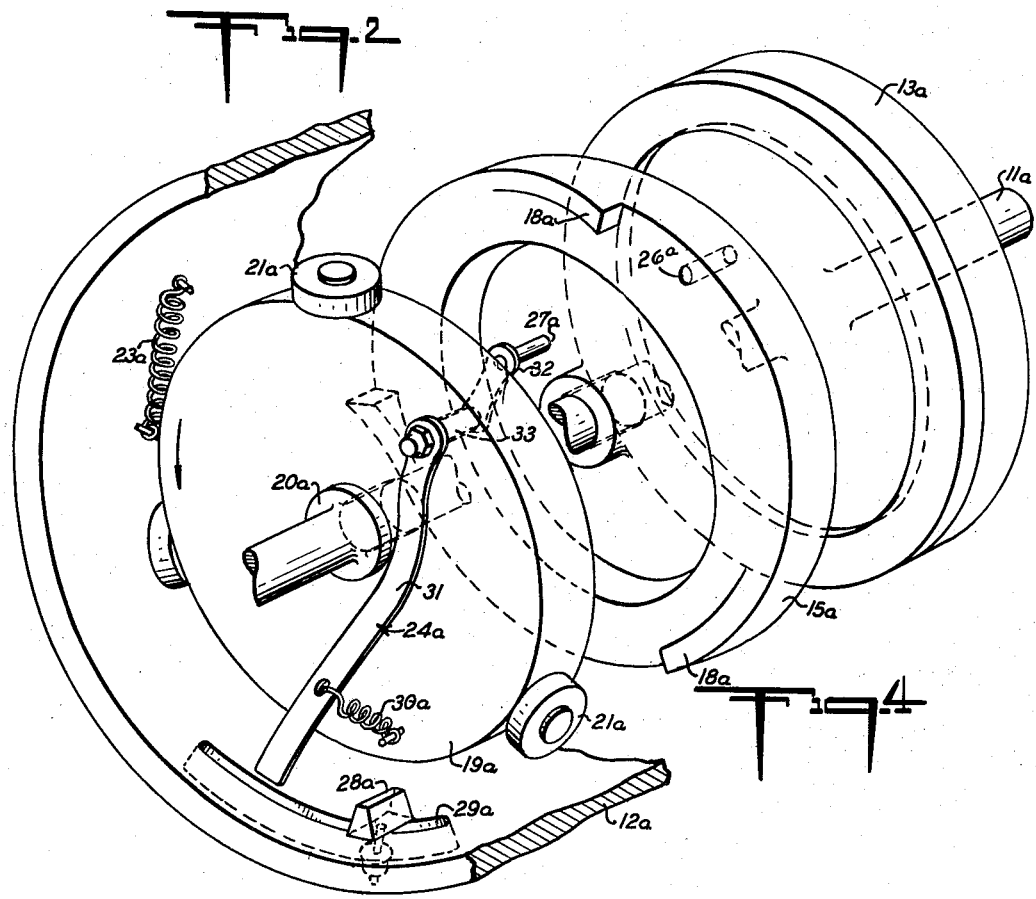

United States Patent Office 2,884,104
Patented Apr. 28, 1959

2,884,104

MECHANICAL COUPLING DEVICES

Raymond Alphonse Henri Brochard, Paris, France, assignor to Societe Anonyme dite:Erbede Application March 23, 1956, Serial No. 573,399

Claims priority, application France January 7, 1952

11 Claims. (Cl. 192—56)

The present invention relates generally to mechanical coupling devices and is a continuation-in-part of my application for United States Letters Patent, Serial No. 327,868, filed December 24, 1952, and now abandoned.

Many existing coupling devices, used either as a brake or as a clutch between two members capable of independent rotary or translatory movement about or along a common axis, comprise an arrangement limiting or nullifying the braking or clutching action in response to the relative movement between two elements forming part of one of the two coupled members, such elements being connected by elastic means and subjected to the force being transmitted. These existing devices are usually unreliable and unstable in operation and do not allow the transmitted forces to be limited to a precise value which can be easily adjusted, as required.

Accordingly, it is an object of the present invention to provide mechanical coupling devices, useful either as a brake or as a clutch between two members capable of independent relative rotary or translatory movement about or along a common axis, and which avoid the above mentioned disadvantages of existing devices used for similar purposes.

More specifically, an object of this invention is to provide mechanical coupling devices useful for the above described purposes and wherein the braking force, in the case of a brake, or the force transmitted, in the case of a clutch, may be accurately and reliably limited to a precise value, and that value is easily varied or adjusted.

Another object is to provide mechanical coupling devices of the described character, wherein the predetermined value of the braking force, or of the maximum force that can be transmitted, is maintained substantially constant even after a long period of use and notwithstanding the occurrence of considerable wear, and corresponding changes in the coefficient of friction, of friction elements included in the coupling devices.

In accordance with an aspect of the present invention, a coupling device for interpositioning between two relatively movable members includes first and second frictionally engageable parts, said first part being connected to one of said members for movement with the latter, while said second part and a third or connecting part movable relative to the latter have cooperating wedging means normally causing frictional engagement between said first and second parts so that the force that may be frictionally transmitted therebetween is greater than the force to be transmitted between the two relatively movable members and normally there is no slippage between the frictionally engageable parts, resilient connecting means between said third part and the other of said relatively movable members to transmit the desired force to said other member in a manner causing self-tightening of the wedging means while allowing relative movement between said third part and said other member in proportion to the force being transmitted, and uncoupling means responding to a predetermined and adjustable maximum transmitted force, as indicated by the relative movement between said third part and other member, to free the wedging means and thereby permit slipping of the frictionally engageable parts at the predetermined maximum force to be transmitted.

Another aspect of the invention resides in the provision of uncoupling means that is operated by a force applied by said other relatively movable member upon the occurrence of the predetermined relative movement of said other member and third part, so that the maximum force to be transmitted is determined by the resilient means and by the reaction of the force applied to the uncoupling means which may vary with the condition and speed of movement of the frictionally engageable surfaces of the first and second parts, and wherein the uncoupling means serves to amplify the force applied thereto so that a relatively small applied force will be sufficient to free the wedging means and any variations in the reaction of that relatively small applied force will not appreciably disturb the accuracy with which the coupling device maintains the predetermined braking force or maximum transmitted force.

The above, and other, objects, features and advantages of the present invention will be apparent in the following detailed description of illustrative embodiments which is to be read in connection with the accompanying drawings forming a part hereof, and wherein:

Fig. 3 is a perspective view, partly broken away and in section, showing another embodiment of the invention useful either as a brake or clutch between two members which are capable of relative rotation about a common axis; and Fig. 4 is an exploded perspective view showing the several parts making up the embodiment of Fig. 3.

Figure 1:
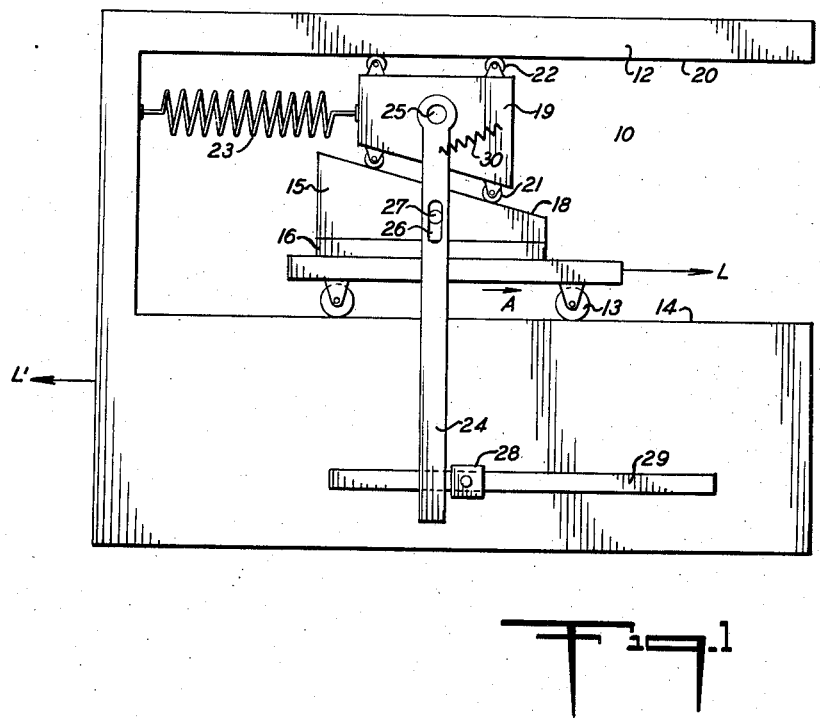
Fig. 1 is a diagrammatic side elevational view of a coupling device embodying the present invention and which is adapted to act either as a brake or a clutch between two members capable of relative translatory motion along a common axis.

Referring to the drawings in detail, and initially to Fig. 1 thereof, it will be seen that a coupling device, there generally identified by the reference numeral 10, may be provided, in accordance with the present invention, between two members 11 and 12 that are capable of relative translatory or linear motion along a common axis or direction as represented by the arrow A. The members 11 and 12 are assumed to be freely movable in the direction of the arrow A in the absence of the coupling device 10 and, in the diagrammatically illustrated embodiment of the invention such free relative movement is achieved by providing the member 11 with anti-friction rollers 13 riding on a track or guideway 14 of the member 12 which extends parallel to the direction of relative motion.

The coupling device 10 includes an intermediate member 15 having friction lining 16 on one surface thereof which is frictionally engageable with a surface 17 of the member 11 extending parallel to the direction of relative motion of the members 11 and 12. The surface 18 of the intermediate member 15, at the side of the latter opposed to the friction lining, is inclined, as shown, and is engaged by a connecting member 19 which is movable along a track or guideway 20 on the member 12 also extending parallel to the direction of relative translatory motion of the members 11 and 12 so that the movement of the member 19 in the direction away from the surface 17 of member 11 is limited by the guideway 20. It is assumed that the friction between the member 19 and the surface 18 and guideway 20 will be negligible and, for this purpose, the member 19 may be provided with anti-friction rollers 21 and 22 engaging the inclined surface 18 and the guideway 20, respectively. A spring 23 is connected between the member 19 and the member 12 and resists the relative motion thereof in the direction of the arrow A with a force that varies in accordance with the extension and contraction of the spring.

The parts of the coupling device 10 described above form a self-tightening friction catch or coupling between the relatively movable members 11 and 12, and the material of the lining 16 on member 15 as well as the slope of the inclined surface 18 of the latter are selected to normally prevent any slipping between the lining 16 and the surface 17 of member 11. If the coefficient of friction between the lining 16 and the surface 17 is indicated as $f$, the friction between all other surfaces being assumed to be negligible, and the slope of the surface 18 of member 15 is indicated by $p$, the above condition can be achieved by selecting the lining material and slope of the surface 18 so that $f \times p$ is greater than 1. Under these circumstances, as a load L is applied to the member 11 to move the latter to the right as viewed in Fig. 1, the intermediate member 15 will move with the member 11 while the spring 23 will resist corresponding movement of the member 19 with a restraining force R which is equal to the load L so that the member 19, being wedged between the inclined surface 18 of member 15 and the guideway 20 exerts a force P upon the member 15 normal to the surface 17 that is equal to the product of $p$ and R. Since the frictional force F resisting sliding of the lining 16 and surface 17 is equal to the product of $f$ and P, such frictional force can be stated to be equal to the product $f$, $p$ and R. Having arranged for $f \times p$ to be greater than 1, it is apparent that the frictional force F, resisting sliding, will be greater than the spring force R and the load L.

Thus, as the load applied to the member 11 is increased, the members 15 and 19 will move as a unit with the member 11 relative to the member 12 and the spring 23 will progressively stretch to increase the tension therein and thereby transmit the increased load to the member 12.

The parts of the coupling device 10 described above would be effective to transmit from the member 11 to the member 12 any load or force L applied to the latter, limited only by the strength of such parts. However, in accordance with the present invention, the self-tightening friction catch or coupling described above is combined with an uncoupling mechanism that permits slipping between the lining 16 and the surface 17 when an adjustably predetermined load or force L is applied to the member 11, thereby to limit the force that may be transmitted between the members 11 and 12. This uncoupling mechanism acts, when a predetermined load is applied to the member 11, to effect relative movement of the members 15 and 19 in the direction for releasing or freeing the wedging action against the intermediate member 15, and includes an uncoupling arm 24 pivoted, at one end as at 25, on the member 19 and having a slot 26 receiving a pin 27 that projects from the intermediate member 15. An abutment 28 is suitably adjustable along a slot 29 in the member 12 and projects into the path of travel of the freeing end of uncoupling arm 24 as the latter moves with members 11, 15 and 19, as a unit, in response to the application of a load or force L to the member 11. Since the extension or stretching of the spring 23 will, at any instant, be a function of the force transmitted thereby between the members 11 and 12 which corresponds to the applied load L and, since the movement of the arm 24 with the members 11, 15 and 19 corresponds to the extension of the spring 23 under load, it is apparent that the adjustment of the abutment or stop 28 along the slot 29 can be calibrated in terms of the maximum force to be transmitted. Thus, the abutment 28 can be disposed along the slot 29 so that, when the spring 23 has an extension corresponding to a predetermined maximum force to be transmitted thereby between the members 11 and 12, the free end of arm 24 will engage the abutment 28. Thereafter, any further increase in the load or force L applied to the member 11 to cause further extension of the force transmitting spring 23 will cause the arm 24 to pivot in the clockwise direction, as viewed on Fig. 1, and such pivoting of the arm 24 will tend to move the member 15 to the left relative to the member 11 and release the wedging action of the member 19. It is apparent that the wedging action will be released and slipping permitted between the lining 16 and the surface 17 when the force of the pivoted arm 24 against the pin 27 added to the force of the spring 23 becomes greater than the frictional force between the lining 16 and surface 17.

At the instant immediately before sliding commences between the lining 16 and surface 17, the force being transmitted between the members 11 and 12 is the sum of the force of spring 23 and the reaction force of the abutment 28 against the arm 24. It is apparent that continued use of the coupling device 10 may result in some change in the condition of the lining 16 and surface 17 thereby altering the coefficient of friction and the frictional force therebetween so that some change may occur in the force that must be applied by the arm 24 against the pin 27 to combine with the force of the spring 23 in overcoming the normally higher frictional force to begin slipping between the lining 16 and surface 17. If the abutment 28 was directly engageable with the member 15, the full extent of the variation of the force applied against the latter to start the slipping action would be introduced as a variation in the maximum force to be transmitted. However, with the uncoupling mechanism described above, the pivoted arm 24 serves to amplify the force applied to the pin 27 so that a relatively small reaction at the abutment 28 engaging the free end of arm 24 produces a relatively large force against the pin 27 of member 15. Thus, any variation in the reaction at the abutment 28, resulting from a change in the condition of lining 16 and surface 17, will be quantitatively small in relation to the force of spring 23 to which the reaction is added to determine the maximum force to be transmitted and, accordingly, the variation in that predetermined maximum force will be correspondingly small to ensure the accurate and reliable operation of the device.

It is apparent that, in the embodiment of the invention illustrated in Fig. 1, the member 15 rests upon the member 11 so that initial frictional engagement between the lining 16 and surface 17 is effected by gravity acting on the member 15. However, in order to ensure the initial frictional engagement when the coupling device is disposed for relative movement of the members 11 and 12 in a direction other than the horizontal direction A of the drawings, a light spring 30 may be interposed between the member 19 and the arm 24 to yieldably urge the latter to pivot in the counter-clockwise direction, as viewed in Fig. 1, so that, prior to contact of arm 24 with the adjustable abutment 28, the members 15 and 19 are urged relative to each other in the direction for initially wedging the member 15 against the member 11.

Figure 2:
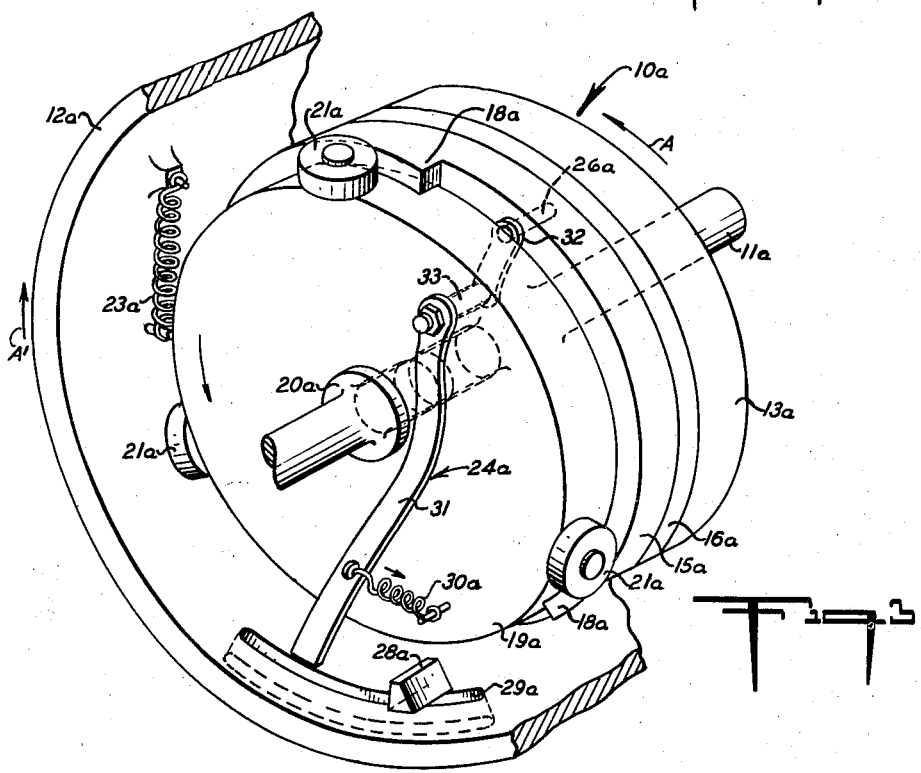
Fig. 2 is a view similar to Fig. 1, but showing the manner in which the illustrated coupling device is adjustable to change the maximum braking force or force to be transmitted.

Reference to Fig. 2 will show that if the abutment 28 is adjusted along the slot 29 toward the right, as viewed in the drawings, from the position of Fig. 1, the extent of stretch of the spring 23, and hence the force transmitted by the latter to the member 12, achieved prior to contact of arm 24 with the abutment will be increased so that uncoupling will then occur only upon the application of a correspondingly increased load L to the member 11. Thus, movement of the abutment 28 along the slot 29 provides a convenient means for varying the maximum force to be transmitted by the coupling device 10.

The adjusting movement of the abutment 28 may be effected manually, for example after loosening of a bolt or clamp holding the abutment in its adjusted position, or any suitable mechanical, electrical or hydraulic assembly (not shown) may be provided for controlling the adjusting movement from a location remote from the actual coupling device.

It is apparent that, if the abutment 28 is moved toward the left from the position of Fig. 1, it may be made to engage the arm 24 and pivot the latter clockwise to prevent wedging of member 15 against member 11 even when the spring 23 is in its fully contracted condition so that the coupling will then be incapable of transmitting any load between the members 11 and 12. If the members 11 and 12 are both movable in the direction A, the coupling device 10 can be used as a clutch for transmitting a predetermined maximum force from the member 11 to the member 12. When the abutment 28 is moved to its extreme leftward position to pivot arm 24 in the contracted condition of spring 23, as described above, the clutch will be disengaged and, when the abutment is moved to a position corresponding to a predetermined maximum force to be transmitted, the coupling device will transmit the force applied to the member 11 to the member 12 until the applied force exceeds the predetermined maximum and then slipping will occur so that the force transmitted to the member 12 will not exceed the predetermined maximum value. If the member 12 is immovable, the coupling device will act as a brake which is released by movement of the abutment 28 to its extreme leftward position and which, in other positions of the abutment, applies a corresponding predetermined maximum braking force resisting movement of the member 11.

Although the present invention has heretofore been described with reference to a coupling device for use between two members 11 and 12 which are capable of relative translatory or linear movement along a common axis, it is to be noted that the invention is not so limited, and coupling devices embodying the invention may be provided for transmitting a predetermined maximum force between two members capable of relative rotational movement about a common axis, for example, as shown in Figs. 3 and 4.

The coupling device 10a of Figs. 3 and 4 is adapted to transmit an adjustably predetermined maximum force between two members 11a and 12a which are relatively rotatable about a common axis and which are respectively in the form of a shaft and a cylindrical housing. The shaft 11a has a disc 13a rigidly connected thereto, and an annular lining 16a of friction material is provided on one side of the disc 13a.

An intermediate disc member 15a is mounted on the shaft 11a at the side of the disc 13a bearing the lining 16a and is freely rotatable and axially movable with respect to the shaft 11a. The side of intermediate disc member 15a facing toward the friction lining 16a is adapted to frictionally engage the latter when the member 15a is moved axially toward the disc 13a. Another disc or connection member 19a is mounted on the shaft 11a and free to rotate with respect to the latter. The disc member 19a is located at the side of the member 15a facing away from the disc 13a and movement of the disc member 19a axially away from the disc 13a is limited by a radial flange 20a extending from the shaft 11a and against which the central portion of the member 19a abuts.

The disc member 15a has one or more inclined ramps or cam surfaces 18a which project axially from the peripheral portion of the side surface of member 15a facing toward the disc member 19a, and the latter has rollers 21a mounted on radial axes at its periphery for rolling contact with the corresponding ramps or cam surfaces 18a. Assuming that the shaft 11a is to be subjected to a rotation producing force in the direction of the arrow A (Fig. 3), that is, in the counter-clockwise direction, as viewed in the drawings, it will be noted that the projection of each of the ramps 18a increases in the opposite direction, that is, clockwise, so that rotation or angular displacement of the member 19a relative to the member 15a in the clockwise direction will, by reason of the engagement of rollers 21a with ramps 18a and the limiting action of the flange 20a, cause the member 15a to be displaced axially into frictional engagement with the friction lining 16a on the disc 13a of shaft 11a.

The disc member 19a is connected to the housing 12a by at least one spring 23a so that a force transmitted from the shaft 11a to the member 19a by way of the frictional engagement of member 15a with lining 16a and by way of the engaged ramps 18a and rollers 21a, will, in turn, be transmitted to the housing 12a by way of the spring or springs 23a.

It is apparent that the above described parts of the coupling device 10a form a self-tightening friction catch or coupling since, following initial frictional engagement of member 15a with the lining 16a, the force transmitted by the coupling tends to rotate member 15a in the counter-clockwise direction relative to member 19a, that is, in the direction causing the rollers 21a and the inclined ramps 18a to cooperate in providing a wedging action increasing the axial pressure of the member 15a against the lining 16a.

As in the first described embodiment, the slope of the inclined ramps 18a and the material of the friction lining are selected so that, at all times, except when the force to be transmitted exceeds a predetermined maximum value, as hereinafter described in detail, the frictional force preventing slipping of member 15a and lining 16a substantially exceeds the force to be transmitted to the housing 12a by the spring 23a. Thus, normally, the members 15a and 19a move rotationally, as a unit, with the disc 13a and shaft 11a, while the spring 23a expands and contracts in accordance with changes in the force being transmitted thereby to the housing 12.

The self-tightening friction catch or coupling, to the extent described above, would have no limit on the force that could be transmitted thereby from the shaft 11a to the housing 12a, except that resulting from failure of the parts therein. However, in accordance with the present invention, the coupling device 10a, as in the case of the previously described device 10, includes an uncoupling mechanism releasing the wedging action of the ramp 18a and rollers 21a upon the transmission of an adjustably predetermined maximum force and thereby permitting rotational slipping between the lining 16a and disc member 15a. The uncoupling mechanism of the device 10a includes a double-lever or arm 24a having a relatively long part 31 and a relatively short part 32 that are rigidly connected to the opposite ends of an axle 33 (shown in broken lines on Figs. 3 and 4) to extend radially from the latter in generally diametrically opposed directions. The axle 33 of arm 24a is rotatably received in a bore extending through the disc member 19a parallel to the axis of shaft 11a and located adjacent to the periphery of the member 19a. As seen in Fig. 3, the arm 24a is pivotally mounted on the disc member 19a with the short part 32 between the latter and disc member 15a and with the long part 31 at the opposite side of the member 19a, and a pin 27a extends axially from the free end of the short part 32 in the direction away from member 19a and is received in an axially extending bore 26a provided in the disc member 15a. The bore 26a is spaced radially outward from the axis of shaft 11a with respect to the bore in member 19a receiving the axle 33 so that, when the parts are assembled, as in Fig. 3, the long part 31 of arm 24a extends generally diametrically across the member 19a and projects, at its free end, beyond the periphery of the member 19a. Further, the cross-section of the bore 26a may be elongated in the direction radially from the axis of shaft 11a so that rocking of the arm 24a can produce relative angular displacement of the members 15a and 19a.

It is apparent that initial frictional engagement between the member 15a and the lining 16a on disc 13a can be effected by manually turning or angularly displacing the housing 12a in the direction opposed to the direction in which force is to be transmitted to the latter. Such displacement will be transmitted by the spring 23a to the member 19a to turn the latter relative to the member 15a, which, of course, has inertia, in the direction for starting the wedging action of the rollers 21a on the inclined ramps 18a. As soon as frictional engagement has been initiated between member 15a and lining 16a, transmission of the force applied at the shaft 11a to the housing 12a will serve to increase the wedging action and the frictional force, as described above. However, in the illustrated coupling device 10a, a relatively light spring 30a is connected between the arm 24a and the member 19a to yieldably urge the arm 24a to rock in the direction causing relative angular displacement of the members 15a and 19a resulting in movement of the rollers 21a toward the relatively high portions of the inclined ramps or cam surfaces 18a, thereby to initiate the wedging action and effect initial frictional engagement between the member 15a and lining 16a.

In order to limit the force transmitted by the coupling device 10a from the shaft 11a to the housing 12a, an abutment 28a is mounted, for example, by a suitable bolt, in a circumferentially extending slot 29a in the housing 12a and projects into the path of movement of the free end of long part 31 of arm 24a when the latter moves, as a unit with the members 19a and 15a and the disc 13a and shaft 11a, relative to the housing 12a in response to the extension of the spring 23a by the force being transmitted. Since the extension of the spring 23a is a predetermined function of the force being transmitted thereby, the position of the abutment 28a along slot 29a can be calibrated in terms of the maximum force or couple to be transmitted.

When a predetermined maximum force is being transmitted to the housing 12a by the spring 23a, the end of part 31 engages the abutment 28a at the corresponding adjusted position of the latter. If the force applied to the shaft 11a then exceeds the predetermined maximum value to cause further extension of the spring 23a, the additional angular movement of the members 15a and 19a as a unit with disc 13a and shaft 11a relative to housing 12a, results in the angular displacement of arm 24a in the direction opposed to the action of light spring 30a, that is, in the direction releasing the wedging action of the rollers 21a and inclined ramps 18a.

As in the first described embodiment, the arrangement of the arm 24a provides a force available for effecting the relative angular displacement of members 15a and 19a that is greater than the reaction of abutment 28a against the free end of part 31 of the arm so that the reaction may be small in relation to the force of the spring 23a and any variations in said reaction, caused by changes in the condition of the engageable surfaces of member 15a and lining 16a, will have a negligible affect upon the accuracy with which the predetermined maximum value of the force to be transmitted may be maintained.

It is apparent that, if the abutment 28a is moved to the left-hand end of the slot 29a, as viewed in Fig. 3, the abutment can be made to engage and rock the arm 24a even when the spring 23a is fully contracted, or in its no load condition, thereby to disengage the coupling device and prevent the transmission of any force from shaft 11a to housing 12a. Thus, as in the case of the device 10, the coupling device 10a can be adjusted conveniently to transmit any force from zero to an upper limit dictated only by the strength of the various parts. Although the abutment 28a is shown to be manually adjustable along the slot 29a, it is obvious that suitable mechanical, electrical or hydraulic systems may be devised for adjusting the position of the abutment from a location remote from the coupling device. If both the housing 12a and the shaft 11a are rotatable, the coupling device 10a can act as a clutch therebetween for limiting the force that is to be transmitted, while, if the housing 12a is held stationary, the coupling device 10a can act as a brake for applying a predetermined maximum braking force opposing rotation of the shaft 11a.

In the above descriptions of the devices 10 and 10a, it has been assumed that the members 11 and 11a, respectively, are the driving members, and that the members 12 and 12a are the driven members. However, it will be apparent that, in each embodiment, these conditions can be reversed. Thus, in the coupling device 10 the force L' could be applied to the member 12 in the direction indicated (Fig. 1), that is in the direction opposed to the direction of the force L applied to the member 11 in the above detailed description, while in the coupling device 10a the housing 12a could be rotated in the direction of the arrow A', that is, in the direction opposed to the rotation of the shaft 11a assumed in the above detailed description, and, in either case, the coupling devices will operate in the manner previously described herein.

Although illustrative embodiments of the invention have been described in detail herein and shown in the accompanying drawings, it is to be understood that the invention is not limited to such embodiments, and that various changes and modifications may be effected therein by one skilled in the art without departing from the scope or spirit of the invention, as defined in the appended claims.

What is claimed is:

1. A mechanical coupling device for coupling together first and second members that are arranged for independent relative movement parallel to each other; said device comprising an intermediate member frictionally engageable with said first member, a connecting member movable relative to said intermediate member in opposed directions parallel to the relative motion of said first and second members, cooperating means on said intermediate and connecting members urging said intermediate member into frictional engagement with said first member in response to relative movement of said intermediate and connecting members in one of said opposed directions and releasing said intermediate member from frictional engagement with said first member in response to relative movement in the other of said opposed directions, elastic means acting between said connecting member and said second member to transmit a force therebetween in a direction tending to move said connecting member relative to said intermediate member in said one of the opposed directions and permitting relative displacement of said connecting and second members corresponding to the transmitted force, uncoupling means operative to move said connecting and intermediate members relative to each other in the other of said opposed directions, and means carried by said second member and reacting on said uncoupling means to operate the latter in response to the occurrence of a predetermined relative displacement of said connecting and second members; said cooperating means on said intermediate and connecting members including rollers on one of the latter and at least one cam surface on the other of said intermediate and connecting members inclined with respect to said opposed directions of the relative movement of said intermediate and connecting members.

2. A mechanical coupling device for coupling together first and second members that are arranged for independent relative movement parallel to each other; said device comprising an intermediate member frictionally engageable with said first member, a connecting member movable relative to said intermediate member in opposed directions parallel to the relative motion of said first and second members, cooperating means on said intermediate and connecting members urging said intermediate member into frictional engagement with said first member in response to relative movement of said intermediate and connecting members in one of said opposed directions and releasing said intermediate member from frictional engagement with said first member in response to relative movement in the other of said opposed directions, elastic means acting between said connecting member and said second member to transmit a force therebetween in a direction tending to move said connecting member relative to said intermediate member in said one of the opposed directions and permitting relative displacement of said connecting and second members corresponding to the transmitted force, uncoupling means operative, when reacted against with a relatively small force, to apply a relatively large force moving said connecting and intermediate members relative to each other in the other of said opposed directions, and abutment means carried by said second member and reacting on said uncoupling means to operate the latter in response to the occurrence of a predetermined relative displacement of said connecting and second members.

3. A mechanical coupling device as in claim 2; wherein said force multiplying uncoupling means includes a lever pivotally connected to said intermediate and connecting members at spaced locations adjacent one of the ends of the lever and projecting, at the other of its ends, into the path of movement of said abutment means with said second member relative to said connecting member.

4. A mechanical coupling device as in claim 2; further comprising yieldable means normally urging said intermediate and connecting members to move relative to each other in said one of the opposed directions, thereby to effect initial frictional engagement between said first member and said intermediate member, said yieldable means being overcome by said uncoupling means when said abutment means reacts against the latter.

5. A mechanical coupling device as in claim 2; wherein said relative movement of said intermediate and connecting members is translatory and rectilinear to adapt the coupling device for coupling together first and second members that are similarly arranged for independent, translatory movement along parallel, rectilinear paths.

6. A mechanical coupling device as in claim 2; wherein said relative movement of said intermediate and connecting members is in the form of angular displacement about a common axis to adapt the coupling device for coupling together first and second members that are similarly capable of independent relative rotational movement about said common axis.

7. A mechanical coupling device for coupling together first and second members rotationally movable relative to each other about a common axis; said coupling device comprising an element secured for rotation with said first member, an intermediate member also rotatable about said common axis and adapted to be urged axially toward said element for frictional engagement with the latter, a connecting member angularly displaceable relative to said interediate member about said common axis, cooperating means on said intermediate and connecting members axially urging said intermediate member into frictional engagement with said element in response to relative angular displacement of said intermediate and connecting members in one direction and releasing said intermediate member from frictional engagement with said element in response to relative angular displacement of said intermediate and connecting members in the opposite direction, spring means connecting said second member to said connecting member and arranged so that, when a force couple is transmitted between said first and second members by way of said intermediate member frictionally engaging said element, said cooperating means on said intermediate and connecting members and said spring means, said connecting member is urged angularly relative to said intermediate member in said one direction to proportionately increase the frictional force between said intermediate member and said element, while said spring means permits relative angular displacement of said second member and connecting member to an extent corresponding to the force being transmitted, uncoupling means operative to relatively angularly displace said intermediate and connecting members in said opposite direction, and an abutment movable with said second member relative to said connecting member and reacting against said uncoupling means to operate the latter in response to a predetermined relative angular displacement of said second and connecting members corresponding to a predetermined maximum force to be transmitted between said first and second members.

8. A mechanical coupling device as in claim 7; wherein said cooperating means includes at least one inclined ramp on said intermediate member and a corresponding roller on said connecting member in rolling contact with an active surface of said ramp, the inclination of said active surface of the ramp and the coefficient of friction between said intermediate member and said element being sufficient to provide a frictional force between said intermediate member and element greater than the force to be transmitted between said first and second members.

9. A mechanical coupling device as in claim 7; wherein said uncoupling means includes a lever pivotally connected at one end, and at a location adjacent said one end, to said intermediate and connecting members, the other end of said lever extending into the path of movement of said abutment with the second member relative to said connecting member to be reacted against by said abutment so that the force available to angularly displace said intermediate and connecting members relative to each other in said opposite direction is substantially greater than the reaction force of said abutment against the lever.

10. A mechanical coupling device as in claim 9; further comprising yieldable means acting between said lever and connecting member and urging said lever to rock in the direction causing relative angular displacement of said intermediate and connecting members in said one direction for effecting initial frictional engagement between said intermediate member and said element.

11. A mechanical coupling device as in claim 9; wherein said abutment is positionally adjustable about said common axis with respect to said second member, thereby to permit variation of the relative rotational movement of said second member and connecting member effective to bring said abutment into reacting engagement with said other end of the lever.

References Cited in the file of this patent

UNITED STATES PATENTS

| | | |
|---|---|---|
| 1,322,119 | Kiwul | Nov. 18, 1919 |
| 1,955,380 | Eddison | Apr. 17, 1934 |
| 2,151,724 | Wengel et al. | Mar. 28, 1939 |
| 2,276,430 | Stechbart | Mar. 17, 1942 |
| 2,482,134 | Tice | Sept. 24, 1949 |
| 2,541,947 | Starkey | Feb. 13, 1951 |